United States Patent [19]

Kubota

[11] Patent Number: 4,792,117
[45] Date of Patent: Dec. 20, 1988

[54] MATERIAL FOR VALVE SEATS
[75] Inventor: Kazuhisa Kubota, Yamanashi, Japan
[73] Assignee: Kitz Corporation, Tokyo, Japan
[21] Appl. No.: 36,661
[22] Filed: Apr. 9, 1987
[51] Int. Cl.$^4$ .......................... C08L 27/18; F16K 1/14
[52] U.S. Cl. ..................................... 251/315; 251/368; 525/199
[58] Field of Search ................. 525/199; 251/315, 368

[56] References Cited

U.S. PATENT DOCUMENTS

| | | | |
|---|---|---|---|
| 4,147,824 | 4/1979 | Dettmann et al. | 428/318.6 |
| 4,262,101 | 4/1981 | Hartwimmer et al. | 526/89 |
| 4,379,858 | 4/1983 | Suzuki | 525/199 |
| 4,592,534 | 6/1985 | Ueda et al. | 251/368 |

FOREIGN PATENT DOCUMENTS

| | | | |
|---|---|---|---|
| 0138524 | 4/1985 | European Pat. Off. | 525/199 |
| 56-116742 | 9/1981 | Japan | 525/199 |
| 58-51481 | 11/1983 | Japan . | |

Primary Examiner—Allan M. Lieberman
Attorney, Agent, or Firm—Wenderoth, Lind & Ponack

[57] ABSTRACT

A material for valve seats is molded of a composite resin. The composite resin is composed of polytetrafluoroethylene and a copolymer of tetrafluoroethylene and perfluoroalkylvinylether. The amount of the copolymer falls in the range of from 3% to 30% by weight, preferably in the range of from 10% to 30% by weight, based on the total amount of the composite resin.

3 Claims, 2 Drawing Sheets

MATERIAL FOR VALVE SEATS

BACKGROUND OF THE INVENTION AND RELATED ART STATEMENT

The present invention relates to a novel material for seats of valves used for controlling the flow of water, oil or gas pertaining to the ordinary life field and/or for regulating the flow of any fluid used in the field of manufacturing such as the chemical industry, petrochemical industry, pharmaceutical industry, drink and food industry, etc. and, more particularly, relates to a material for ball seats attached to ball valves.

Generally, the ball seats of this type are made of polytetrafluoroethylene (hereinafter referred to briefly as "PTFE") solely or in combination with glass fiber, carbon fiber or such metal powder as bronze powder. Further, as disclosed in Japanese Utility Model Publication No. 58-51481, ball seats molded of a copolymer of tetrafluoroethylene and perfluoroalkylvinylether (hereinafter referred to simply as "PFA") are also known to the art.

As is well known, PTFE exhibits a very low frictional resistance, has a static friction not greater than its dynamical friction, and is excellent in resistance to wear, chemicals and temperature. This is why PTFE has found widespread acceptace as a material for seats of ball valves. For this reason, PTFE is specified as a material for ball seats in The Japan Petroleum Institute's Standard, "Flanged Ball Valves for Petroleum Industry" (JPI-7S-48-74) and also in the British Standard, "Steel ball valves for petroleum, petrochemical and allied industries" (BS 5351:1976).

However, the ball seats made of PTFE are inferior in resistance to creep and, when being used under high pressure, give rise to creep, thereby undergoing permanent deformation and resulting in malfunction of the associated ball valves. In order to avoid such malfunction, it is required to place restrictions on the maximum pressure to be used. Particularly, since the larger a valve bore, the larger a force exerted on a ball seat, the maximum pressure to be used must be restricted to a much lower level. The maximum pressure usable for each of the standardized ball seats is also specified in The Japan Petroleum Institute's Standard and The British Standard. Under the specified maximum pressure, however, problems resulting from creep still remain.

Why resistance to creep is necessary for ball valves will now be described.

When pressure is applied onto the upstream side of a ball valve kept closed, for example, it acts on a ball of the ball valve and consequently the ball compresses a ball seat on the downstream side of the ball valve. This compressing force causes deformation of the seat and consequently creep of the seat. After the downstream seat has undergone such creep as described above, when the application of pressure onto the upstream side is released, the ball supported between the downstream seat and a ball seat on the upstream side of the ball valve with the aid of their elastic deformation will descend by an amount corresponding to the creep quantity. In this state, when pressure is again applied onto the upstream side, a fluid leaks toward the downstream side through a gap formed by the descent of the ball. At this time, the ball valve has lost its sealing function. At the time of first application of pressure onto the upstream side, there is a fair possibility of the upstream seat being shifted from its fixed position toward a valve chamber between the ball and a valve body, with the result that the upstream seat undergoes creep. In this case, the upstream seat cannot support the ball thereon and, when the application of pressure onto the upstream side is released, the ball is allowed to descend. In order to avoid the aforementioned adverse phenomena, it is necessary for the seats to be protected from creep.

In view of the drawbacks suffered by PTFE, so-called reinforced PTFE has recently found widespread acceptance. The reinforced PTFE is formed by admixing glass fiber or carbon fiber with PTFE as described above and is superior in resistance to creep to PTFE per se. However, the superiority in resistance to creep is not completely satisfactory. In addition, the cost of the PTFE reinforced with glass fiber and the cost of the PTFE reinforced with carbon fiber are about 1.3 times and about 2 times respectively that of PTFE per se.

Further, when the flow of such monomers as styrene is controlled with a ball valve having ball seats of PTFE or reinforced PTFE, the styrene permeates the seats and is polymerized therein to cause embrittlement of the seats, thereby giving rise to breakage of the seats and malfunction of the ball valve.

On the other hand, the aforementioned copolymer "PFA" is very excellent as a material for ball seats because it inhibits permeation of such monomers as styrene, exhibits high resistance to creep, is capable of being used under high pressure even under the aforementioned maximum pressure usable and does not suffer from the problems resulting from creep encountered by PTFE or reinforced PTFE. However, the cost of PFA is 5 to 10 times that of PTFE, resulting in very expensive products.

In the field of the valve manufacturing, no one skilled in the art has tried to blend a synthetic resin with another synthetic resin into a composite material having desired characteristics in spite of the presence of various composite materials composed of a synthetic resin and materials other than synthetic resins.

OBJECT AND SUMMARY OF THE INVENTION

The main object of the present invention is to provide a novel and useful material for valve seats, obtained by blending a synthetic resin with another synthetic resin, comparable in resistance to creep and monomer permeation to PFA, comparable in friction resistance to PTFE and economical because the cost thereof is as high as that of reinforced PTFE and particularly, capable of completely satisfying the conditions required for ball seats attached to and mounted on ball valves.

To attain the object described above, according to the present invention, there is provided a material for valve seats, molded of a composite resin composed of a copolymer of tetrafluoroethylene and perfluoroalkylvinylether, and polytetrafluoroethylene with the amount of the copolymer falling in the range of from 3% to 30% by weight, preferably in the range of from 10% to 30% by weight, based on the total amount of the composite resin.

According to the present invention, therefore, it is possible to provide a composite material capable of exhibiting not only excellent characteristics comparable to those of PTFE but also excellent characteristics comparable to those of PFA and, when the amount of PFA falls in the range of from 3% to 30% by weight based on the total amount of the composite material, the resultant material is satisfactory as a material for valve seats and is inexpensive in manufacturing cost as compared with a seat material composed solely of PFA.

The above and other objects, characteristic features and advantages of the present invention will become more apparent to those skilled in the art as the disclosure is made in the following description of preferred embodiments of the invention, as illustrated in the accompanying drawings.

DETAILED DESCRIPTION OF THE PREFERRED EMBODIMENTS

The present invention relates to a novel material for seats attached to and mounted on a valve for controlling the flow of a fluid, such as a ball valve, butterfly valve, etc. The novel seat material of the present invention is a composite material composed of PFA and PTFE, exhibits excellent characteristics of high resistance to creep, friction, chemicals and temperature, and is very inexpensive as compared with a material composed solely of PFA.

Figure 1:
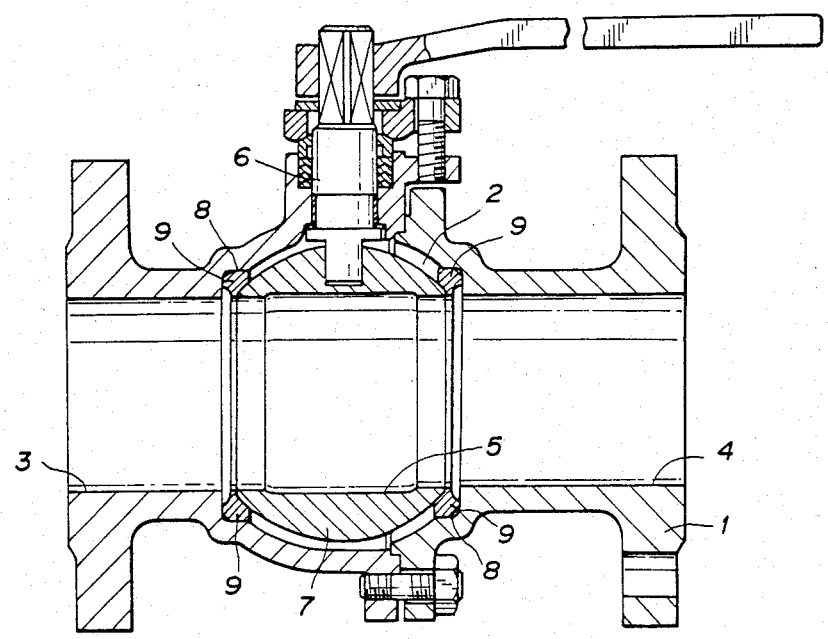
FIG. 1 is a longitudinal cross section illustrating a ball valve having attached thereto ball seats made of a novel material according to the present invention.

Referring to FIG. 1 showing a ball valve in longitudinal cross section provided with ball seats 9 which are molded from the novel material of the present invention, reference numeral 1 designates a valve body having a valve chamber 2 formed therein and also having inlet 3 and outlet 4 formed therein across the valve chamber 2 and communicating with the valve chamber 2. Denoted by numeral 7 is a ball of the ball valve, which has a through hole 5 formed therein and is rotatably assembled within the valve chamber 2. The ball 7 is rotated by a stem 6 coupled thereto between an open position at which the inlet and outlet 3 and 4 of the valve body 1 communicate with each other via the through hole 5 of the ball 7 accommodated within the valve chamber 2 of the valve body 1 and a closed position at which the communication between the inlet and outlet 3 and 4 is cut off by the ball 7. The seats are annular and are mounted on stepped portions 8 formed on the corners within the valve chamber 2 so as to be kept in seal contact with the ball 7. Although the number of the annular seats 9 is two in FIG. 1, one of them may be omitted.

Assuming that a given pressure is applied onto the ball 7 from the side of the inlet 3 when the ball valve is in a closed state, the ball 7 is urged toward the outlet 4 to compress the seat 9 on the side of the outlet 4. However, since the seat 9 of the present invention is molded from a composite material composed of PTFE and PFA and is therefore excellent in resistance to creep, it can protect the ball valve from function deterioration unlike the conventional seat composed solely of PTFE liable to undergo under the aforementioned given pressure, creep which causes the ball to descend and consequently the function of the ball valve to be lowered. Even when such monomers as styrene etc. are used as a fluid, the seat 9 of the present invention can protect the ball valve from malfunction unlike the conventional seat which allows the styrene to permeate thereinto and be polymerized therein and consequently embrittles to cause the ball valve to be out of order.

It will be described how the seat 9 of the present invention is molded. One of the materials for the seat 9 of the present invention, PTFE, is difficult to fluidize even under high temperatures. In molding a seat from PTFE alone, therefore, it is necessary to prepare a billet of PTFE, charge the billet into a mold set and compress under heat the billet within the mold set. On the other hand, the other of the materials for the seat 9 of the present invention, PFA, is readily fluidized at high temperatures. In molding a seat from PFA alone, therefore, any suitable molding method, such as an injection molding method, is adopted in accordance with the state of fluidization of the PFA. The seat 9 of the present invention is produced by blending powdered PFA with powdered PTFE into a composite material in an amount of 3% to 30% by weight based on the total amount of the composite material, forming a billet of composite material, charging the billet into a mold set and compressing under heat the billet within the mold set. If the amount of the powdered PFA is less than the lower limit of the aforementioned range, the resistance to creep is insufficiently enhanced to fail to attain one of the objects of the present invention. If the amount is more than the upper limit, it is difficult to mold the composite material in substantially the same manner as the molding method for a seat composed solely of PTFE and it is impossible to achieve another object of the present invention which is to provide an inexpensive seat because the cost of PFA is about five to ten times the cost of PTFE. The cost of a ball seat consists of the cost of the material for the seat and the cost of the molding work. Since the latter cost is comparatively higher than the former cost, substantially the same molding method as that for molding a seat from PTFE alone is adopted in molding the seat of the present invention. As a result, the seat of the present invention can be produced at a cost which is within about twice the cost of a seat molded solely from PTFE.

If the amount of PFA to be blended with PTFE is not less that 3% by weight based on the total amount, the resistance to creep is considerably enhanced as compared with the case where the amount is less than 3% by weight. To further enhance the resistance to creep, the amount of PFA is not less than 10% by weight based on the total amount. This will be demonstrated by experiments, the results of which are shown in FIGS. 2 and 3.

A ball seat of the present invention was prepared by blending PFA in an amount of 20% by weight based on the total amount of the ball seat with PTFE and was attached to and mounted on a ball valve having a normal diameter of 100 mm. Similarly, a ball seat molded solely of PTFE and that molded of PTFE reinforced with glass fiber were attached to and mounted on the same kind of ball valves respectively for the purpose of comparison. The three seats were tested for creep quantity after application of pressure for one hour. The results are as shown in FIGS. 2 and 3.

Figure 2:
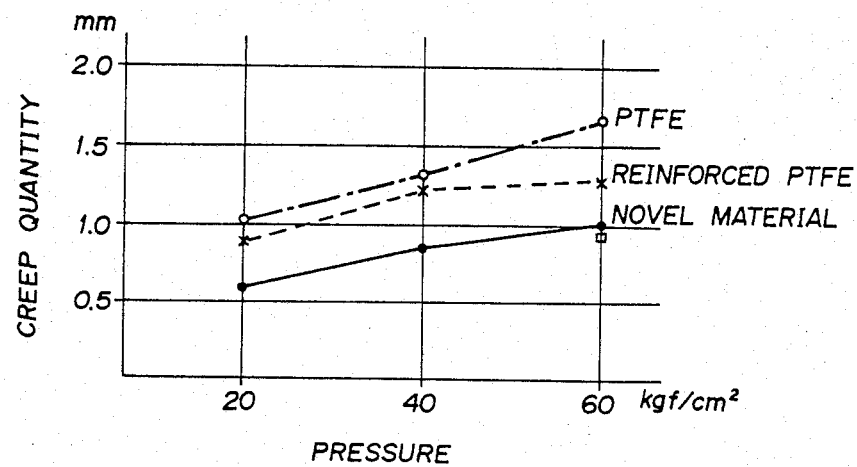
FIG. 2 is a graph showing the relation between the pressure and the creep quantity and illustrating results of the experiments conducted for testing for creep quantities of ball seats made of a novel material of the present invention and, for the purpose of comparison, also testing for creep quantities of the conventional ball seats made solely of PTFE and of reinforced PTFE.
Figure 3:
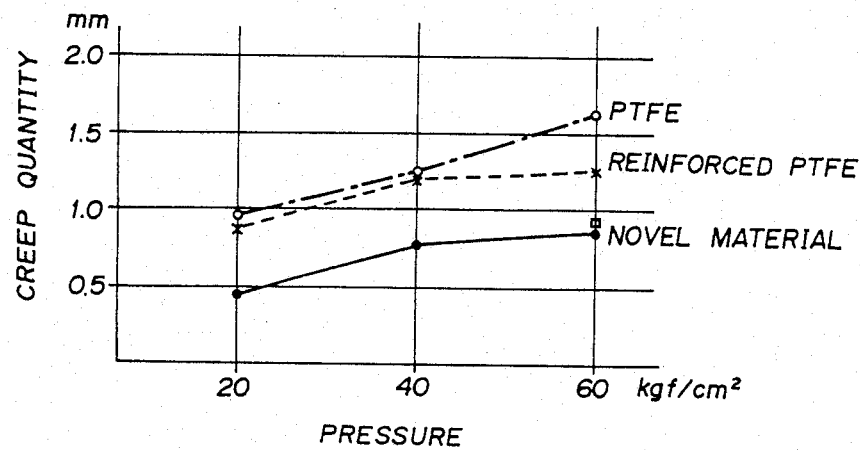
FIG. 3 is a graph showing the relation between the pressure and the creep quantity and illustrating results of the experiments conducted for testing for variations in creep quantity of the aforementioned three kinds of ball seats left standing for 24 hours.

To be more specific, in the graph of FIG. 2, the lateral axis is graduated for the pressure applied onto the ball 7 in FIG. 1 for a period of one hour and the longitudinal axis for the creep quantity of the seats in the axial direction thereof measured upon being detached from the ball valves immediately after the one-hour application of pressure. The blank circles (O) on the chain line indicate the results of experiments conducted with respect to the seat made solely of PTFE, the crosses (X) on the dashed line those with respect to the seat made of PTFE reinforced with glass fiber, and the solid circles ( • ) on the solid line those with respect to the seat of the present invention made of a novel material, respectively. The three kinds of seats thus tested for creep quantity were left standing for 24 hours and then tested again for creep quantity. The results are as shown in FIG. 3. For the purpose of comparison, a seat made solely of PFA was attached to and mounted on the same kind of ball valve, a pressure of 60 kgf/cm² was applied to the ball for one hour, and the seat was immediately detached from the ball valve and tested for creep quantity. The result is as shown by a blank square (□) in FIG. 2. The seat was also left standing for 24 hours and tested again for creep quantity. The result is as shown by a blank square (□) in FIG. 3.

As is clear from the graph of FIG. 2, while the resistance to creep for the depicted seat of reinforced PTFE is enhanced only slightly in comparison with the seat of PTFE alone, the resistance to creep for the seat of the novel material according to the present invention exhibited, is considerably enhanced. Specifically, the creep quantity of the seat of the novel material produced after the one-hour application of pressure of 60 kgf/cm² is substantially the same as that of the seat of reinforced PTFE or PTFE alone produced after the one-hour application of pressure of 20 kgf/cm². According to The British Standard, it is specified that the maximum pressure usable for a seat made solely of PTFE, when being used relative to a valve having a normal diameter of 100 mm at a temperature of 50° C., is 42 bars (42.86 kgf/cm²). Assuming that the creep quantity of the seat made solely of PTFE produced under the specified maximum pressure is an allowable limit, the seat made of the novel material according to the present invention can be used under a pressure not less than twice the specified maximum pressure for the seat made solely of PTFE.

Thus, when a ball seat is manufactured as described above by using the novel material according to the present invention, it is comparable to a seat made solely of PTFE in resistance to friction, chemicals and temperature, lower in cost than a seat made solely of PFA, comparable in cost to a seat made of reinforced PTFE, and capable of completely satisfying the conditions required for a ball seat. The novel material according to the present invention is thus very useful from a practical point of view.

While in the foregoing description the novel material according to the present invention has been applied to a material for seats of a ball valve, this is by no means limitative. For example, it may readily be used for a butterfly valve or any other valve requiring use of a seat without changing any of the characteristic features of the present invention.

What is claimed is:

1. A valve seat prepared from a resin composition consisting of a blend of powders of 97 to 70% by weight of polytetrafluoroethylene and 3 to 30% by weight of a copolymer of tetrafluoroethylene and perfluoroalkylvinylether.

2. A valve including a valve seat prepared from a resin composition consisting of a blend of powders of 97% to 70% by weight of polytetrafluoroethylene and 3 to 30% by weight of a copolymer of tetrafluoroethylene and perfluoroalkylvinylether.

3. A valve according to claim 2 which is a ball valve.

* * * * *